US012031508B1

(12) United States Patent
Fimml et al.

(10) Patent No.: US 12,031,508 B1
(45) Date of Patent: Jul. 9, 2024

(54) SYSTEMS AND METHODS FOR COMPRESSING ENGINE EXHAUST TO NATURAL GAS PIPELINE

(71) Applicant: INNIO Waukesha Gas Engines Inc., Waukesha, WI (US)

(72) Inventors: Wolfgang Fimml, Maurach in Tirol (AT); Nikolaus Spyra, Innsbruck (AT); Lorne Eugene Nix, Waukesha, WI (US); Kenneth Edward Neuman, Waukesha, WI (US); Shawn Douglas Givler, Brookfield, WI (US)

(73) Assignee: Innio Waukesha Gas Engines Inc., Waukesha, WI (US)

( * ) Notice: Subject to any disclaimer, the term of this patent is extended or adjusted under 35 U.S.C. 154(b) by 0 days.

(21) Appl. No.: 18/104,205

(22) Filed: Jan. 31, 2023

(51) Int. Cl.
*F02M 26/42* (2016.01)
*F02M 26/35* (2016.01)

(52) U.S. Cl.
CPC ............ *F02M 26/42* (2016.02); *F02M 26/35* (2016.02)

(58) Field of Classification Search
CPC ............................... F02M 26/42; F02M 26/35
See application file for complete search history.

(56) References Cited

U.S. PATENT DOCUMENTS

| | | | | |
|---|---|---|---|---|
| 9,689,354 | B1 * | 6/2017 | Beresford-Knox | B01J 23/40 |
| 2005/0268594 | A1 * | 12/2005 | Kurihara | F02C 9/16 60/39.182 |
| 2011/0265454 | A1 * | 11/2011 | Smith | F01N 3/10 123/481 |
| 2017/0030264 | A1 * | 2/2017 | Chen | F01D 15/10 |
| 2017/0259807 | A1 * | 9/2017 | Naidu | B60W 10/08 |

* cited by examiner

*Primary Examiner* — Xiao En Mo
(74) *Attorney, Agent, or Firm* — Fletcher Yoder, P.C.

(57) ABSTRACT

A gas compression system includes a first compressor and a second compressor. The first compressor is configured to compress a first gas for transport through a pipeline to a processing facility having one or more centralized gas aftertreatment systems and the second compressor is configured to compress a second gas for transport through the pipeline to the processing facility, where the first and second gases are different from one another, and the second gas comprises an exhaust gas from a combustion system.

20 Claims, 5 Drawing Sheets

SYSTEMS AND METHODS FOR COMPRESSING ENGINE EXHAUST TO NATURAL GAS PIPELINE

BACKGROUND

The subject matter disclosed herein relates to internal combustion engines and emissions control techniques.

An internal combustion engine may include a reciprocating engine having pistons disposed in respective cylinders of an engine block or a gas turbine engine having a turbine section to convert the expanding gases of a combustion process into mechanical energy. In some scenarios, the engine is used to drive a gas compression system that receives a fuel gas from an upstream source, increases the pressure of the fuel gas, and supplies the fuel gas at the increased pressure to one or more downstream systems. For example, a natural gas production site may include a well, a compressor, an engine coupled to the compressor, and a natural gas pipeline configured to receive compressed natural gas from the compressor to deliver the natural gas to a processing facility such that the natural gas may be processed. During operation, the engine emits exhaust gases as the engine operates to power the compressor to compress the natural gas from the well. These exhaust gases include various undesirable gases or emissions, including carbon oxides ($CO_x$) such as carbon monoxide (CO) and carbon dioxide ($CO_2$), nitrogen oxides ($NO_x$) such as nitrogen monoxide (NO) and nitrogen dioxide ($NO_2$), sulfur oxides ($SO_x$) such as sulfur dioxide ($SO_2$), hydrocarbons (HC), and particulate matter such as soot. Exhaust gas recirculation (EGR) may be used to recirculate the exhaust gas into the intake of the engine, thereby reducing $NO_x$ emissions. However, the exhaust gas is eventually discharged into the atmosphere. Accordingly, a need exists to reduce emissions of the undesirable gases in the exhaust gas at a natural gas production site.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a gas compression system includes a first compressor and a second compressor. The first compressor is configured to compress a first gas for transport through a pipeline to a processing facility having one or more centralized gas aftertreatment systems and the second compressor is configured to compress a second gas for transport through the pipeline to the processing facility, where the first and second gases are different from one another, and the second gas comprises an exhaust gas from a combustion system.

In certain embodiments, a method includes compressing, via a first compressor of a gas compression system, a first gas for transport through a pipeline to a processing facility having one or more centralized gas aftertreatment systems. The method further includes compressing, via a second compressor of the gas compression system, a second gas for transport through the pipeline to the processing facility, where the first and second gases are different from one another, and the second gas comprises an exhaust gas from a combustion system.

In certain embodiments, an exhaust system includes a compressor configured to receive exhaust gas and compress the exhaust gas to a threshold pressure and an engine coupled to the compressor and configured to drive the compressor to compress the exhaust gas. The exhaust system further includes one or more sensors configured to capture sensor data indicative of one or more properties of the exhaust gas and a controller having a processor, a memory, and instructions stored on the memory and executable by the processor to control operation of the engine based on the sensor data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
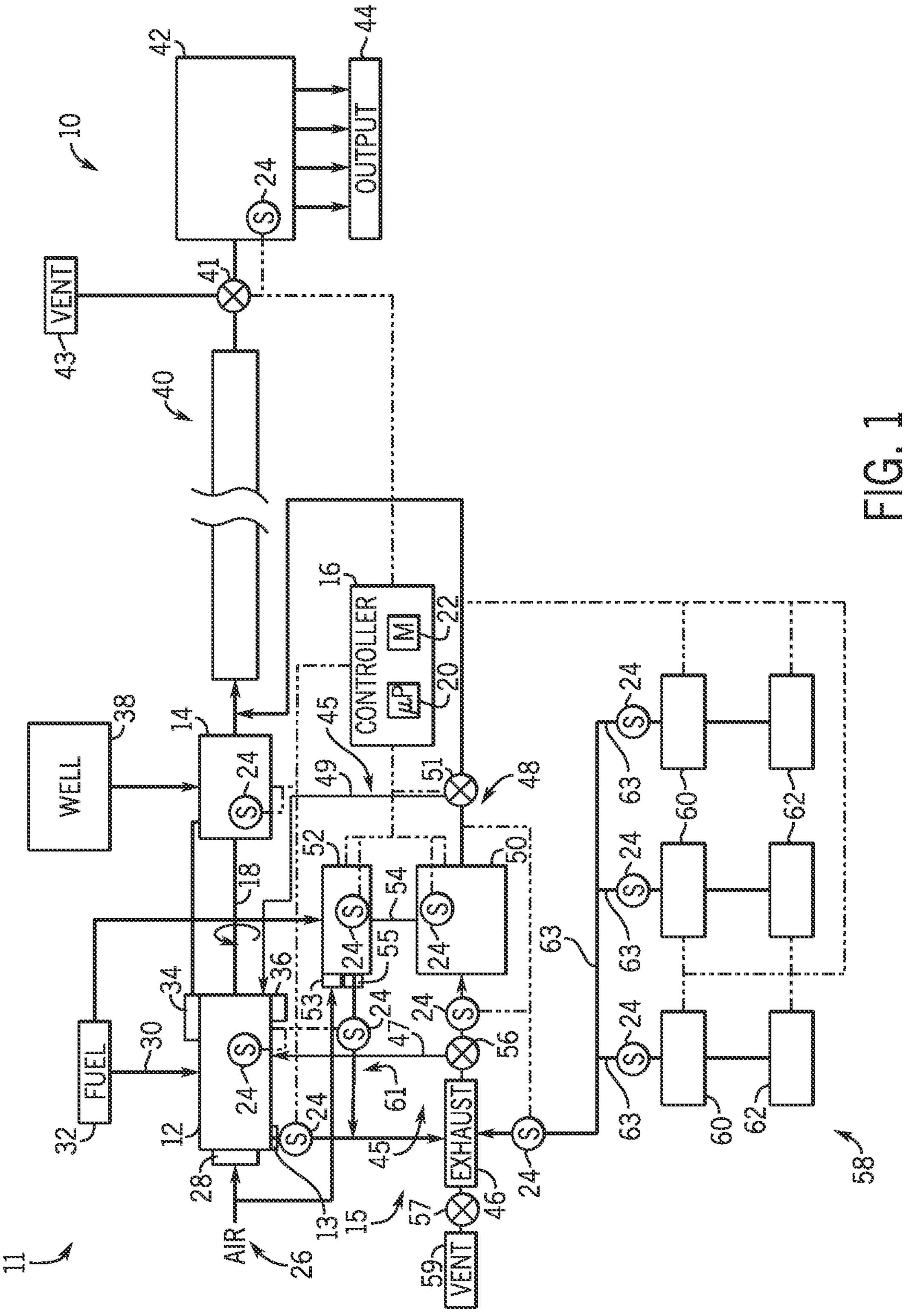
FIG. 1 is a schematic diagram of an embodiment of a gas production site having one or more compression systems that operate to compress natural gas from a well and exhaust gas from an exhaust system and deliver a combined gas flow of the natural gas and the exhaust gas to a processing facility, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

It is now recognized that traditional natural gas production sites employing one or more compression systems may not efficiently control undesirable emissions of exhaust gases that are generated during operation of the natural gas production site. For example, natural gas production sites may employ a number of different sub-systems and components (e.g., compression systems having an internal combustion engine and a compressor) that compress natural gas and deliver the natural gas to a processing facility for processing. During operation of the natural gas production site, the various engines employed to operate the compressors to compress the natural gas release exhaust gas into the atmosphere. In traditional natural gas production sites, the exhaust gas, which may contain various undesirable gases (e.g., $CO_x$, $NO_x$, $SO_x$, etc.), is not captured and instead is released to the atmosphere via venting. Thus, it is now recognized that improved systems and methods for capturing and remotely treating the exhaust gas from a natural gas production site are desired.

Accordingly, the present disclosure is directed to improved systems and methods for capturing exhaust gas from a gas production site (e.g., natural gas production site) having one or more gas compression systems, and directing the captured exhaust gas to a processing facility for processing. Each of the gas compression systems may include a first compressor driven by a first engine to pressurize a well gas, production gas, or fuel gas (e.g., natural gas) retrieved from a well. In certain embodiments, the fuel gas may originate from any suitable location or facility, not necessarily limited to production from a well. Furthermore, the well gas, production gas, or fuel gas may be described as a raw gas, an untreated gas, a hydrocarbon gas, a sour gas, a synthesis or syngas, a biogas, a coal gas, a blast furnace gas, or a gas needing gas treatment to remove various undesirable contaminants or impurities (e.g., particulate, water, acid gas, etc.). Accordingly, the term "fuel gas" is intended to cover any of the foregoing gas embodiments in context of the present application. Additionally, each of the gas compression systems may include a second compressor driven by a second engine to compress an exhaust gas from the first and second engines. The gas production site may also include a number of other engines coupled to respective loads. During operation, each of the engines employed by the gas production site may produce exhaust gas while operating to satisfy a respective load associated with a particular engine. Engine exhaust gas is a byproduct of the internal combustion process that generates the mechanical energy to drive the gas compressor or other system. As such, the oxygen content of engine exhaust is relatively low compared to the oxygen content of ambient air surrounding the combustion system. Furthermore, in some embodiments, the engine(s) may be run using a stoichiometric balance of intake air and fuel, a sub-stoichiometric balance of intake air and fuel (e.g., rich air-to-fuel ratio), or a super-stoichiometric balance of intake air and fuel (e.g., lean air-to-fuel ratio) to regulate the unburned fuel content and/or oxygen content of the exhaust further.

As exhaust gas is generated by each of the engines employed by the gas production site, the exhaust gas may be directed to the exhaust system having the second compressor, which may be a dedicated compressor configured to compress the exhaust gas to a desired pressure before delivering the exhaust gas to a gas pipeline along with the fuel gas from the first compressor. Additionally, the exhaust system having the second compressor and the second engine may further include multiple stages of compression and various components (e.g., flame arrestor, liquid separator, air scavenger, etc.) that serve to process the exhaust gas as the exhaust gas is directed through the exhaust system. In this way, exhaust gas having a desired composition (e.g., stoichiometric, lean, rich air to fuel ratio) and pressure may be delivered to the gas pipeline to be combined with the fuel gas retrieved from the well. For example, in some embodiments, the engine(s) may operate using a sub-stoichiometric balance of intake air and fuel to reduce the oxygen content of the exhaust gas to a theoretical minimum (e.g., by way of having an excess amount of fuel such that there is not enough oxygen to combust all of the available fuel), and the remaining unburnt fuel may be compressed and injected into a pipeline for delivery to the processing facility. Thus, the oxygen content of exhaust gas injected into the pipeline may be minimized, thereby reducing oxidation and flammability concerns within the pipeline. The pipeline may be fluidly coupled to a gas processing facility which may include a number of systems and components configured to process and treat the fuel gas within the pipeline to remove impurities, remove any generated combustion by-products, or any combination thereof. Thus, present embodiments enable exhaust gases from a number of different sources across a natural gas production site to be collected, compressed, and introduced into the natural gas pipeline for processing at another location. Additionally, present embodiments enable improved monitoring of respective properties of exhaust gases collected by the exhaust gas compression system, thereby enabling improved control of a natural gas production site.

In view of the foregoing, present embodiments, as compared to traditional natural gas production sites, may provide improved systems and methods for capturing, transporting, and treating exhaust gas from a number of different sources across a natural gas production site, thereby reducing costs and increasing efficiency associated with the processing and production of natural gas.

With the foregoing in mind, FIG. 1 is a schematic block diagram of an embodiment of a gas processing site 10 (e.g., natural gas processing site) having a gas compression system 11 with an engine 12, a gas compressor 14, and a controller 16. The engine 12 may be coupled to and drive the gas compressor 14 by a shaft 18. The engine 12 may be a two-stroke engine, four-stroke engine, or other type of engine 12. The engine 12 may also include any number of combustion chambers, pistons, and associated cylinders (e.g., 1-24) in one (e.g., incline) or more (e.g., left and right cylinder banks) cylinder banks of a V, W, VR (a.k.a. Vee-Inline), or WR cylinder bank configuration. For example, in certain embodiments, the system 11 may include a large-scale industrial reciprocating engine having 6, 8, 12, 16, 20, 24 or more pistons reciprocating in cylinders. In some such cases, the cylinders and/or the pistons may have a diameter of between approximately 13.5-31 centimeters (cm). In certain embodiments, the cylinders and/or the pistons may have a diameter outside of the above range. In some embodiments, the engine 12 is a gas turbine engine or a rotary engine. The gas compressor 14 may be a reciprocating gas compressor or a rotary gas compressor. For example, the reciprocating gas compressor may include one or more piston-cylinder assemblies, each having a piston that reciprocates within a respective cylinder to compress a gas. Moreover, each piston of the reciprocating gas compressor may be a double-acting piston, thereby enabling the piston to compress a gas on both sides of the piston as it reciprocates within a respective cylinder.

The controller 16 of the gas compression system 11 may be coupled to the engine 12 and the gas compressor 14.

Although FIG. 1 illustrates a common controller 16 coupled to both the engine 12 and the gas compressor 14, some embodiments of the gas compression system 11 may have the controller 16 (e.g., engine control unit (ECU)) coupled to the engine 12 to monitor and control the engine 12, and a second controller (e.g., compressor control unit) coupled to the gas compressor 14 to monitor and control the gas compressor 14. The controller 16 may include a processor 20 and a memory 22. The memory 22 includes non-transitory, tangible, computer-readable medium storing instructions that are configured to cause the processor 20 to perform specific actions, such as the methods discussed herein. The controller 16 may also include communication circuitry configured to enable the controller 16 to communicate with one or more sensors 24 and actuators (or controllable components) disposed throughout the gas compression system 11. Additionally, the controller 16 may be coupled to controls or valves of the engine 12 to control operation of the engine 12. For example, the controller 16 may control a throttle of the engine 12, the flow rates of air and fuel into the engine 12, and the flow rates of fluids (e.g., coolant, lubricant) through the engine 12. In some embodiments, the controller (e.g., controller 16, ECU, compressor control unit) may determine a desired engine speed (e.g., revolutions per minute (RPM)) of the engine 12, and control the engine 12 to operate at the desired engine speed. For example, the compressor control unit may determine an engine RPM setpoint, provide the engine RPM setpoint to the ECU coupled to the engine 12, and the ECU may control the engine 12 to operate at the engine RPM setpoint. The controller 16 may be coupled to controls or valves of the gas compressor 14 to control operation of the gas compressor 14.

The engine 12 may receive air 26 through an intake manifold 28 for mixing with fuel 30 from a fuel source 32 for combustion within the one or more piston-cylinder assemblies. That is, the air 26 received through the intake manifold 28 may be directed through the engine 12 to be combusted with the fuel 30 in the engine 12. The fuel 30 may include a liquid fuel (e.g., diesel, gasoline) or a gaseous fuel (e.g., methane (natural gas), propane, etc.). In some embodiments, the controller 16 may adjust the flow rates of the air 26 and fuel 30 to maintain a particular air-to-fuel ratio, which may vary based on implementation. For example, the air-to-fuel ratio may be stoichiometrically balanced, fuel-lean (e.g., super-stoichiometrically balanced), or fuel-rich (e.g., sub-stoichiometrically balanced). A coolant system 34 (e.g., radiator) coupled to the engine 12 may facilitate temperature control (e.g., cooling) of the engine 12 during operation by directing a coolant through the engine 12. In some embodiments, the coolant system 34 may be coupled to the gas compressor 14 to facilitate temperature control of the gas compressor 14 during operation by directing a coolant through the gas compressor 14. A lubricant system 36 coupled to the engine 12 may direct a lubricant (e.g., oil) to moving components of the engine 12. In some embodiments, the sensors 24 of the gas compression system 11 may include, but are not limited to gas composition sensors (e.g., oxidant sensors, lambda sensors), flow sensors, temperature sensors (e.g., coolant temperature sensors, lubricant temperature sensors, intake manifold temperature sensors, compressor discharge temperature sensors), vibration sensors, knock detection sensors, compressor rod load sensors, pressure sensors (e.g., intake manifold pressure sensors), speed sensors (e.g., tachometers), microphones, or any combination thereof. In some embodiments, the controller 16 may utilize feedback from the sensors 24 of the gas compression system 11 to calculate gas compression system parameters (e.g., engine load, compressor rod load). For example, the compressor rod load may be determined based on a speed of the engine, measured pressures from the gas compressor, and known properties (e.g., mass, geometry) of components of the gas compressor.

The gas compressor 14 receives a fuel gas (e.g., natural gas, non-natural gas carbon fuel) from an upstream system 38 (e.g., wellhead or production tree, unrefined source, field gas source), pressurizes the fuel gas with the gas compressor 14, and discharges the pressurized fuel gas to a gas pipeline 40. For example, the gas compressor 14 may be fluidly coupled to a well 38 that produces natural gas. The well 38 may be described as a hydrocarbon well, a subterranean well, a natural gas well, or a gas production well. The fuel gas (e.g., natural gas) produced from the well 38 may be directed to the gas compressor 14 for compression before being directed to the gas pipeline 40. In certain embodiments, the fuel gas may correspond to a non-natural gas carbon fuel delivered from an upstream system. Furthermore, in certain embodiments, the fuel gas may correspond to an unrefined fuel gas that has not yet been processed or treated before being directed to the gas compressor 14. The gas pipeline 40 may then direct the compressed fuel gas to a processing facility 42, which may process and/or treat the compressed fuel gas using various systems and sub-systems to generate output 44 (e.g., commercial grade natural gas, blue hydrogen, carbon products, ammonia, and the like), as described in greater detail below. For example, the processing facility 42 may be a natural gas processing system that includes an acid removal system, a water removal system, a mercury removal system, a nitrogen removal system, a helium removal system, a natural gas liquids removal system, a heavy hydrocarbon removal system, a blue hydrogen production system, a carbon capture system, an ammonia production system, or any other suitable system or process that may receive the fuel gas from the pipeline 40 and process the fuel gas to generate output (e.g., commercial grade natural gas, byproducts).

As stated above, the engine 12 may provide the mechanical energy for operating the gas compressor 14 via internal combustion, which may generate exhaust gas 46. In general, the exhaust gas 46 is expelled to the environment. The exhaust gas 46 generated by the engine 12 includes one or more undesirable gases or emissions, including $CO_x$ such as CO and $CO_2$, $NO_x$ such as NO and $NO_2$, $SO_x$ such as $SO_2$, hydrocarbons, and particulate matter such as soot. In some embodiments, an EGR system 45 may recirculate the exhaust gas into the intake of the engine 12 to help reduce the emissions of $NO_x$, as discussed in greater detail below. Additionally, in some embodiments, the engine 12 may include one or more standard exhaust gas treatment systems (e.g., local exhaust gas treatment systems, exhaust aftertreatment to ambient environment systems) such as catalytic converters, silencers, mufflers, dehydrators, and the like, which may be used to process and/or treat the exhaust gas from the engine 12. However, additional utility may be found by treating the exhaust gas at the processing facility 42 (e.g., with centralized exhaust gas aftertreatment systems), rather than using standard (e.g., local) exhaust gas treatment systems at the engine 12. That is, in certain embodiments, the processing facility 42 may correspond to a centralized exhaust gas aftertreatment system configured to reduce or eliminate the use of standard exhaust gas treatment systems at the engine 12, thereby reducing the costs and complexity associated with gas treatment at the engine 12. Accordingly, as disclosed herein, "standard exhaust gas treatment systems" may refer to gas treatment systems that are located proximate the engine and are configured to process the exhaust gas at the engine to remove undesirable emissions, while "centralized exhaust gas aftertreatment systems" may refer to gas treatment systems that are located remote from the engine and are configured to process the exhaust gas and/or fuel gas in the pipeline 40 to remove the undesirable emissions. As discussed herein, by utilizing centralized exhaust gas aftertreatment systems, standard exhaust gas treatment systems at the engine 12 may be reduced and/or eliminated. For example, by directing the exhaust gas to the pipeline 40 to be processed by a centralized exhaust gas aftertreatment system, the catalytic converter of a standard exhaust gas treatment system may be eliminated.

Thus, the disclosed embodiments route the exhaust gas 46 to an exhaust system 48, which may pre-treat and compress the exhaust gas 46 to a desired pressure before delivering the exhaust gas 46 to the pipeline 40 to be combined with the fuel gas (e.g., natural gas) from the upstream system 36 (e.g., well), thereby enabling the exhaust gas 46 and the fuel gas retrieved from the well 38 to be processed by the processing facility 42. Accordingly, the engine 12 may include an exhaust outlet 13, and the exhaust outlet 13 may be fluidly coupled to the exhaust system 48 via a conduit 15 (e.g., pipe). The exhaust system 48 may include a second gas compressor 50 (e.g., dedicated gas compressor, exhaust gas compressor) coupled to an engine 52 via a crankshaft 54. The engine 52 may be similar to the engine 12 and thus may be configured to drive the compressor 50 to compress the exhaust gas 46 delivered to the compressor 50 to a desired pressure before directing the exhaust gas 46 to the pipeline 40. Indeed, as a byproduct of the internal combustion process, the exhaust gas 46 may, depending on the operation (e.g., air-to-fuel ratio) of the engine 12, have an oxygen content that is relatively low (e.g., less than 5%, less than 3%, less than 1%, or less than 0.5% by weight or by volume), and may have other undesirable gases or emissions (e.g., $CO_x$ such as CO and $CO_2$, $NO_x$ such as NO and $NO_2$, $SO_x$ such as $SO_2$, hydrocarbons, and particulate matter such as soot) that can be extracted at the processing facility 42 for additional use and/or protection of the environment. The engine 52 may receive air 26 via an air intake manifold 53 for mixing with fuel 30 from the fuel source 32. That is, the air 26 received through the intake manifold 53 may be directed through the engine 52 to be combusted with the fuel 30 in the engine 52.

Similar to the discussion above with respect to the engine 12, the exhaust system 48 may exclude any standard exhaust gas treatment systems (e.g., catalytic converter) configured to remove undesirable emissions, such as one or more of $CO_x$ such as CO and $CO_2$, $NO_x$ such as NO and $NO_2$, $SO_x$ such as $SO_2$, hydrocarbons, and particulate matter. However, the exhaust system 48 may include one or more local exhaust gas compression pre-treatment systems (e.g., compressors, dehydrators, flame arrestors, liquid separators, air scavengers, and the like) to make the exhaust gas 46 suitable for transport in the pipeline 40. As noted above, "standard exhaust gas treatment systems" may refer to exhaust gas treatment systems that are configured to remove undesirable emissions and/or remove generated combustion by-products from exhaust gas or from a fuel gas at a respective engine, while "centralized exhaust gas aftertreatment systems" may refer to gas treatment systems that are located remote from a respective engine and are configured to process the exhaust gas and/or fuel gas in the pipeline 40 to remove undesirable emissions. Further, "local exhaust gas compression pre-treatment systems" may refer to gas treatment systems that are configured to alter one or more properties of the exhaust gas or fuel gas (e.g., pressure, oxygen content) such that the exhaust gas or fuel gas is suitable for transport in the pipeline 40. That is, while the local exhaust gas compression pre-treatment systems may treat or process the fuel gas or the exhaust gas to some extent to modify certain physical properties of the fuel gas or exhaust gas, such local exhaust gas compression pre-treatment systems are not associated with removing generated combustion by-products and/or undesirable emissions, which instead may be removed by centralized exhaust gas aftertreatment systems at the processing facility 42. Thus, the exhaust gas 46 may be treated substantially or entirely at the processing facility 42 after flowing through the pipeline 40, such that one or more centralized exhaust gas aftertreatment systems can treat both the fuel gas (e.g., natural gas) and the exhaust gas 46 to remove various impurities, contaminants, and undesirable gases as noted above.

In some embodiments, the controller 16 may utilize the one or more sensors 24 to monitor the composition (e.g., oxygen content, relative stoichiometric balance), flow rate, volume, and/or pressure of the exhaust gas 46 and selectively use, not use, or regulate the flow of the exhaust gas 46 (e.g., via a valve 56) to the exhaust system 48. That is, similar to the discussion above with respect to the engine 12, the controller 16 may control a throttle of the engine 52, the flow rates of air and fuel into the engine 52, and the direction of fluids (e.g., coolant, lubricant) through the engine 52. In some embodiments, the controller 16 may determine a desired speed of the engine 52 based on various properties of the exhaust gas 46 (e.g., oxygen content, relative stoichiometric balance) to be compressed by the compressor 50. For example, upon determining a sufficient amount (e.g., greater than a threshold amount) of exhaust gas 46 is available, the controller 16 may send a signal to transition the valve 56 towards an open position, thereby enabling the exhaust gas 46 to flow towards the compressor 50. Further, the controller 16 may determine an amount of fuel 30 and air 26 to deliver to the engine 52 to generate a suitable power to drive the compressor 50 based on the amount of exhaust gas 46 and/or based on a desired pressure differential that the exhaust system 48 is expected to impart on the exhaust gas 46. For example, if the compressor 50 of the exhaust system 48 is tasked with increasing the pressure of an exhaust gas flow to within a threshold deviation of the pressure within the pipeline 40 (e.g., tasked with achieving a certain pressure differential), the controller 16 may determine the requisite amounts of air 26 and fuel 30 to deliver to the engine 52 such that the compressor 50 may increase the pressure of the exhaust gas 46 by the desired pressure differential. In some embodiments, exhaust gas flows may have different pressures when directed to the exhaust system 48. Accordingly, in some embodiments, the controller 16 may determine the requisite amounts of air 26 and fuel 30 for the engine 52 to drive the compressor 50 based on a current pressure of the exhaust gas 46 before it is delivered to the exhaust system 48. In this way, the controller 16 may operate the engine 52 efficiently depending on the properties of the exhaust gas 46 directed towards the exhaust system 48.

As noted above, in certain embodiments, the gas compression system 11 may also include the EGR system 45 which may be configured to re-direct exhaust gas back into the engine 12 to be used as a diluent for combustion in the engine 12, thereby reducing emissions. For example, the EGR system 45 may include a low-pressure EGR line 47 and a high-pressure EGR line 49 configured to deliver low-pressure and/or high-pressure exhaust gas back to the engine 12 to be utilized as a diluent. The low-pressure EGR line 47 may be fluidly coupled to the valve 56, which may be a three-way valve or modulating valve configured to enable a flow of low-pressure exhaust gas back to the engine 12 before the exhaust gas is compressed by the compressor 50. The high-pressure EGR line 49 may be fluidly coupled to the valve 51, which may be a three-way valve or modulating valve configured to enable a flow of high-pressure exhaust gas back to the engine 12 after the exhaust gas is compressed by the compressor 50.

In some embodiments, the controller 16 may determine (e.g., based on data from the sensors 24) that the exhaust system 48 is not operational (e.g., due to a malfunction in the exhaust system 48), and thus the controller 16 may send a signal to transition the valve 56 towards a closed position, and transition a valve 57 towards an open position such that the exhaust gas 46 may be directed towards a vent 59 configured to release the exhaust gas 46 to the atmosphere. Additionally or alternatively, the controller 16 may monitor other parameters (e.g., fuel flow, air flow, fuel-to-air ratio) or operating modes (e.g., stoichiometric or non-stoichiometric) of the engine 12 that may affect the composition of the exhaust gas 46 via the one or more sensors 24. For example, upon determining that the exhaust gas 46 generated via operation of the engine 12 has a lean air-to-fuel ratio, the controller 16 may control an amount of air 26 or increase the fuel 30 directed to the engine 52 to help move the air-to-fuel ratio toward a stoichiometric air-to-fuel ratio. Similarly, upon determining that the exhaust gas 46 generated via operation of the engine 12 has a rich air-to-fuel ratio (e.g., sub-stoichiometric balance), the controller 16 may control an amount of air 26 or decrease the fuel 30 directed to the engine 52 to help move the air-to-fuel ratio toward a stoichiometric air-to-fuel ratio. As noted above, in some embodiments, the controller 16 may determine to operate the system using a sub-stoichiometric balance (e.g., rich air-to-fuel ratio) to minimize the oxygen content in the exhaust gas. For example, using a sub-stoichiometric balance, the amount of air provided to the engine 12 may be insufficient to combust all of the fuel that is directed to the engine 12 such that excess fuel remains. Because the excess fuel has little to no oxygen content, the excess fuel may be injected into the pipeline, which may further minimize oxidization and/or flammability within the pipeline 40. Furthermore, depending on implementation (e.g., the oxygen content of the exhaust gas 46, natural gas liquids content, water content, particulate content, etc.), the exhaust gas 46 may be treated via the exhaust system 48 (e.g., via one or more local exhaust gas compression pre-treatment systems as discussed below in relation to FIG. 2) to prepare the exhaust gas 46 for introduction into the gas pipeline 40.

The engine 52 also generates exhaust gas 46 while operating the compressor 50 to compress the exhaust gas 46 from the engine 12. As such, exhaust gas 46 generated via operation of the engine 52 may also be directed from an exhaust outlet 55 of the engine 52 to the exhaust system 48 via a conduit 61 and/or the conduit 15 to be compressed by the compressor 50 before being directed to the pipeline 40. Further, the sensors 24 may be positioned such that various properties of the exhaust gas 46 generated by the engine 52 may be monitored, thereby enabling control of the compressor 50 and/or the engine 52 (e.g., reduce a speed of the engine 52 in response to determining that an amount of exhaust gas exceeds a threshold value, modify an amount of air 26 delivered to the engine 52, etc.). In certain embodiments, the gas processing site 10 may also include additional exhaust gas sources 58, such as one or more additional combustion systems and/or engines 60. For example, the gas processing site 10 may include one or more additional engines 60 coupled to respective loads 62 (e.g., compressor, electric generator, machinery, gas turbine, mechanical drive engine etc.), each of which may produce exhaust gas 46 during operation. By further example, the combustion systems may include one or more furnaces, boilers, heating systems, or any combination thereof, configured to produce exhaust gas 46. The exhaust gas 46 produced by the additional exhaust gas sources 58 may be directed via one or more conduits 63 to the exhaust system 48 for compression and processing (e.g., via the local exhaust gas compression pre-treatment systems) before being delivered to the pipeline 40. In some embodiments, each of the additional exhaust gas sources 58 may include sensors 24 configured to monitor various properties (e.g., flow rate, composition) of the exhaust gas 46 produced by the additional exhaust gas sources 58, such that control of the compressor 50 and the engine 52 may be enabled. For example, depending on the amount and/or pressure of the exhaust gas 46 produced from the additional exhaust gas sources 58, the controller 16 may control an amount of air 26 and fuel 30 directed to the engine 52 to control the power output and/or speed of the engine 52 to provide a suitable amount of compression of the exhaust gas 46.

Figure 2:
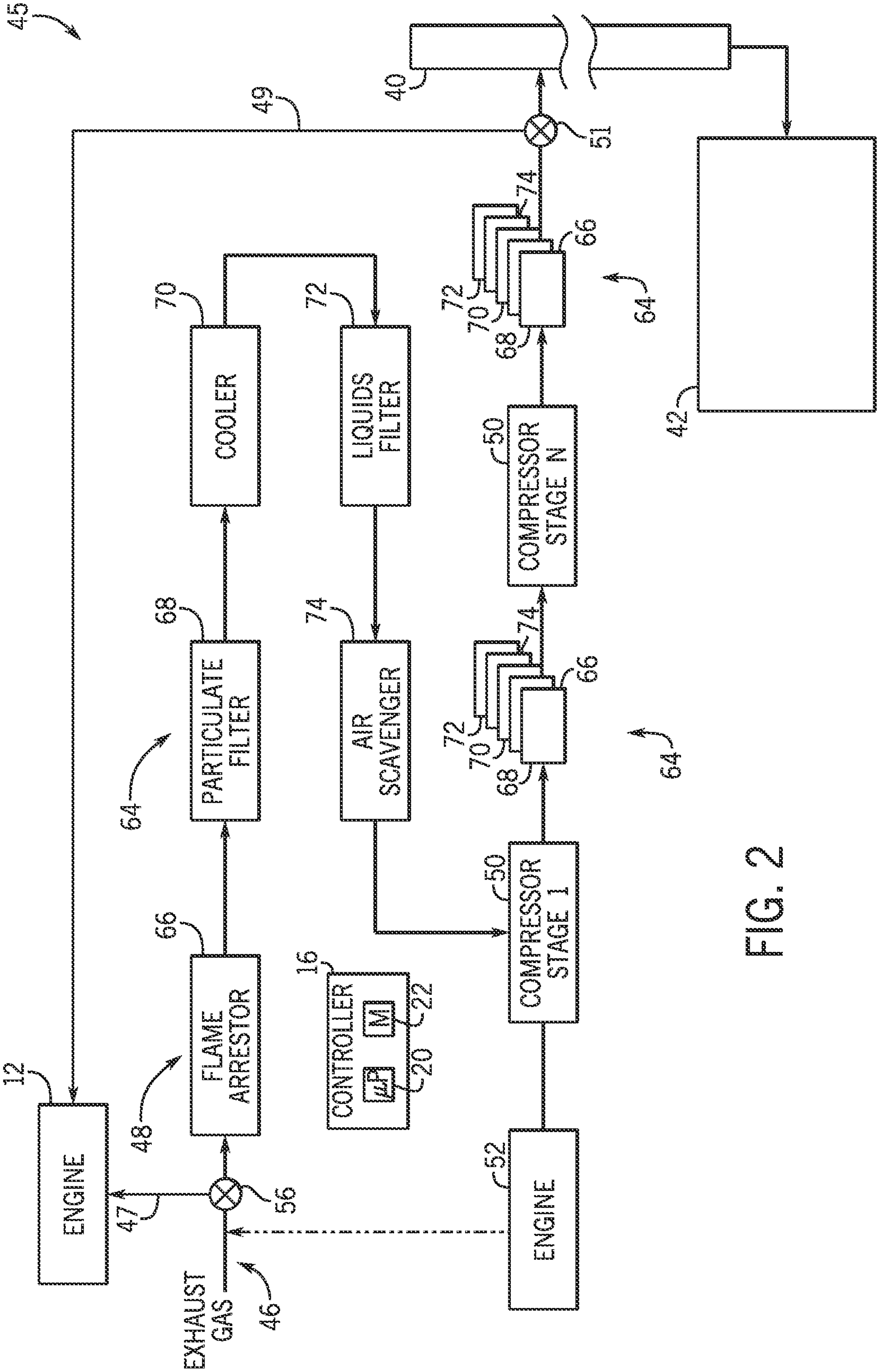
FIG. 2 is a schematic diagram of an embodiment of the exhaust system of FIG. 1, in accordance with aspects of the present disclosure.

In general and as noted above, the exhaust system 48 of the gas compression system 11 may compress and prepare the exhaust gas 46 via one or more local exhaust gas compression pre-treatment systems (e.g., flame arrestors, particulate filters, coolers, liquid removers, air scavengers, and the like), prior to delivering the exhaust gas 46 to the pipeline 40. For example, as shown in FIG. 2, the exhaust gas 46 directed to the exhaust system 48 may be treated/processed through one or more auxiliary exhaust treatment components or treatments 64 (e.g., local exhaust gas compression pre-treatment systems) prior to being delivered to the pipeline 40. In some embodiments, the exhaust gas 46 may progress through one or more flame arrestors 66 to enable exhaust gas flow while blocking transmission of any flames (e.g., extinguishing flames). Accordingly, a flame arrestor 66 may increase the lifespan of components downstream of the flame arrestor 66. A particulate filter 68 may be used to remove particles and/or particular substances from the exhaust gas 46. For example, in some embodiments, the particulate filter 68 may be a sulfated ash, phosphorus, and sulfur (SAPS) filter. Moreover, the exhaust gas 46 may be cooled via one or more cooling systems, such as direct or indirect heat exchangers or coolers 70. As discussed below, the cooler 70 may be disposed between stages of compression, and thus the cooler 70 may be described as an intercooler. Cooling may increase the manageability of the exhaust gas 46 and/or reduce the temperature below the dew point, such that water vapor and/or other vaporized substances condensate. The cooling also helps to improve the efficiency of compression.

Additionally, a liquids filter 72 (e.g., dryer) may remove the condensate such as water and/or saturated vapors. The liquids filter 72 may include a liquid gas separator, such as a centrifugal separator, a gravity separator, or a combination thereof. Additionally, in some embodiments, the exhaust gas 46 may pass through an air or oxygen scavenger 74 to further reduce the oxygen content of the exhaust gas 46. However, in embodiments in which the engine 12 is operating using a sub-stoichiometric balance, the air scavenger 74 may be eliminated as the oxygen content of the exhaust gas may be negligible. Moreover, in some embodiments, the exhaust gas 46 may pass through multiple stages of compression to generate an exhaust gas 46 with a desired pressure, and one or more of the auxiliary treatments 64 may be used upstream, at, and/or downstream of each stage of compression. For example, the controller 16 may control the multiple stages of compression to compress the exhaust gas 46 to a threshold pressure before injecting the exhaust gas 46 into the pipeline 40. In some embodiments, to increase an amount of water removal from the exhaust gas 46, the controller 16 may control the compressor 52 to compress the exhaust gas 46 to a pressure beyond that of the threshold pressure (e.g., over-compressed exhaust gas) at which the exhaust gas 46 is introduced into the pipeline 40. In doing so, the pressure dew point of the exhaust gas 46 may increase, and upon providing a final cooling stage (e.g., cooler 70), water may more efficiently condense as a result of the altered pressure dew point of the exhaust gas 46. In this way, an amount of water introduced into the pipeline 40 may be reduced, thereby reducing oxidation and/or a likelihood of corrosion within the pipeline 40. Upon processing the exhaust gas 46 with the final cooling stage, the exhaust gas 46 may be decreased back to the threshold pressure before being injected into the pipeline 40. Alternatively, the over-compressed exhaust gas may be directed through a turbine expander to decrease the pressure of the exhaust gas while providing additional mechanical power that may be utilized elsewhere before being injected into the pipeline 40.

As should be appreciated, the auxiliary treatments 64 of FIG. 2 are given as examples and may or may not be utilized, depending on implementation (e.g., exhaust gas composition). Additionally, one or more of the auxiliary treatments 64 may be combined and/or reordered. For example, the liquids filter 72 and air scavenger 74 may be combined to filter out water (liquid and/or vapor) and oxygen via an iron powder and sodium chloride based oxygen scavenger. After treatment by the local exhaust gas compression pre-treatment systems of the exhaust system 48, the exhaust gas 46 may be directed to the pipeline 40 for delivery to the processing facility 42, thereby enabling processing of the exhaust gas 46 via the centralized exhaust gas aftertreatment systems at the processing facility 42. As noted above, the exhaust gas 46 may have a composition that includes various substances and chemical compounds (e.g., $CO_x$, $NO_x$, $SO_x$, etc.) that may be processed by the processing facility 42 to reduce undesirable emissions into the environment, as described herein.

Returning to FIG. 1, upon compressing and preparing the exhaust gas 46 via the exhaust system 48 (e.g., with the local exhaust gas compression pre-treatment systems), the exhaust gas 46 may be directed towards the pipeline 40 to be combined with fuel gas (e.g., natural gas) from the well 38 that has been compressed by the compressor 14. In some embodiments, upon compressing the exhaust gas to a desired pressure, the controller 16 may send a signal to transition a valve 51 towards an open position such that exhaust gas 46 may be delivered to the pipeline 40. In turn, the pipeline 40 may deliver the exhaust gas 46 and the fuel gas from the well 38 to the processing facility 42 for processing at the centralized exhaust gas aftertreatment systems. As illustrated, the processing facility 42 may also include at least one sensor 24 configured to communicate data associated with the processing facility 42 to the controller 16. For example, the sensor 24 may capture and/or record data indicative of a fault within the processing facility 42, indicating that the processing facility 42 and/or components thereof are no longer operational. Accordingly, the controller 16 may send a signal to transition a valve 41 towards a closed position, such that exhaust gas and fuel gas (e.g., natural gas) within the gas pipeline 40 may be directed to a vent 43 instead of toward the processing facility 42.

Figure 3:
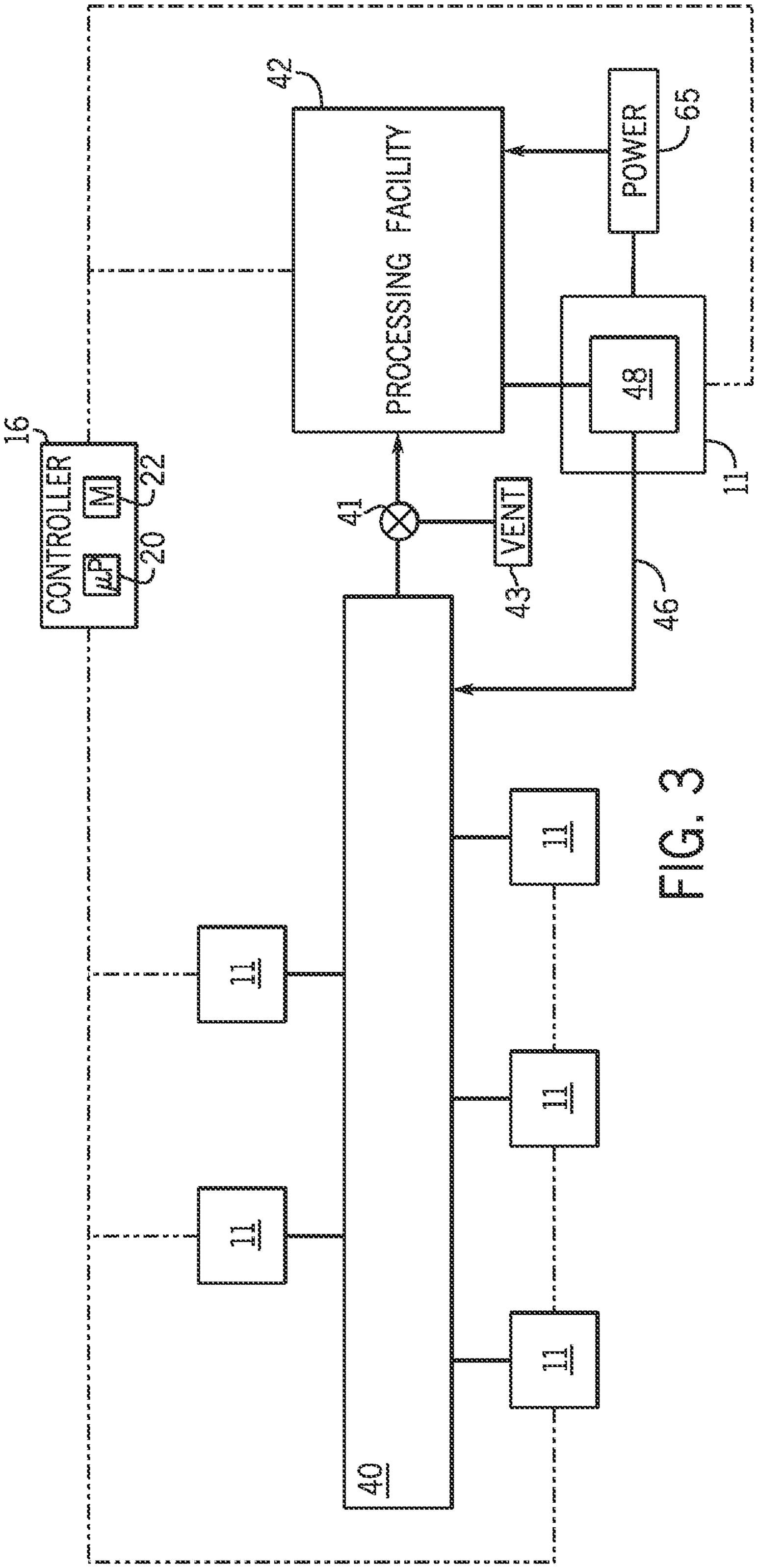
FIG. 3 is a schematic diagram of multiple gas compression systems delivering the combined gas flow to a processing facility, in accordance with aspects of the present disclosure.

It should be noted that in some embodiments, the pipeline 40 may extend for miles across a terrain, and thus may receive compressed gas (e.g., natural gas, exhaust gas) from multiple different gas compression systems 11 at various locations apart from one another (e.g., at least 1, 2, 3, 4, 5, 10, 20, 50 or more miles apart). For example, as shown in FIG. 3, the pipeline 40 may extend between a number of different well sites, each having a gas compression system 11 configured to compress a fuel gas (e.g., natural gas) from a well, and deliver the compressed fuel gas to the processing facility 42 for processing. Furthermore, each of the gas compression systems 11 may include a respective exhaust system 48 configured to receive exhaust gas from one or more engines employed by the respective gas compression system 11, compress and prepare the exhaust gas using local exhaust gas compression pre-treatment systems, and direct the compressed exhaust gas to the pipeline 40 for processing further downstream at the processing facility 42. The processing facility 42 may be positioned at a remote location relative at least some or all of the gas compression systems 11, wherein the processing facility 42 is configured to process a combined flow of the fuel gas and exhaust gas at the remote location rather than separately processing the fuel gas and the exhaust gas at each site location of the gas compression systems 11. For example, the remote location may be at least 1, 2, 3, 4, 5, 10, 20, 30, 40, 50, 100, 200 or more miles away from at least some or all of the gas compression systems 11.

In some embodiments, the processing facility 42 may also be associated with a gas compression system 11 that may include one or more engines configured to drive one or more generators to provide power to operate the various systems and sub-systems of the processing facility 42. As illustrated, the gas compression system 11 configured to provide power 65 to the processing facility 42 may include an exhaust system 48 having a dedicated compressor configured to receive exhaust gas 46 from the one or more engines employed by the gas compression system 11 and deliver the exhaust gas 46 to the pipeline 40 such that the exhaust gas 46 may be processed by the processing facility 42, as described above. In some embodiments, by directing exhaust gas from the gas compression system 11 associated with the processing facility 42 to the pipeline 40, the concentration of $CO_2$ within the pipeline 40 may increase, which may be desirable, as discussed in greater detail below.

Figure 4:
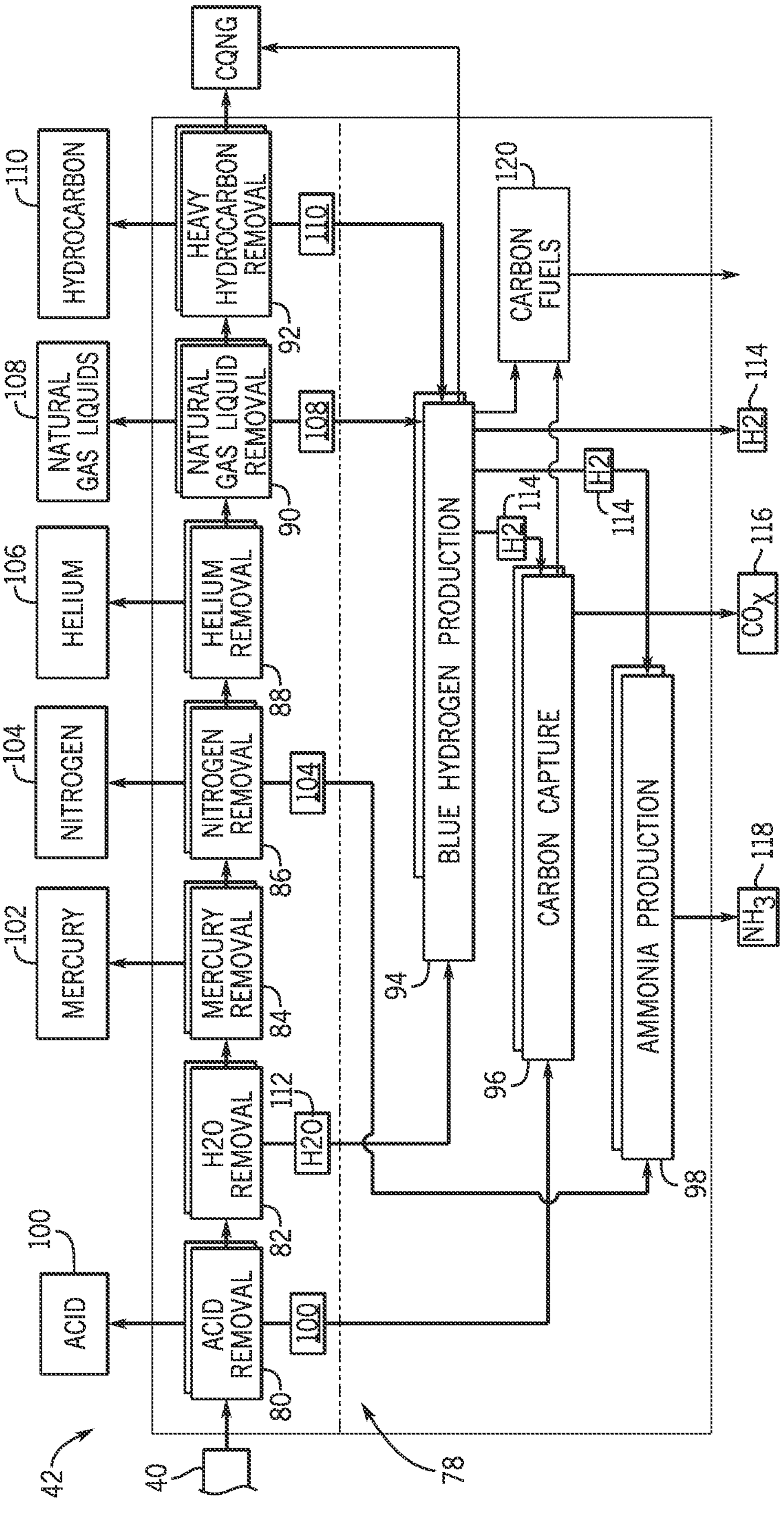
FIG. 4 is a schematic diagram of an embodiment of the processing facility of FIG. 1, in accordance with aspects of the present disclosure.

FIG. 4 is a schematic diagram of an embodiment of the processing facility 42. As illustrated, the processing facility 42 may include a number of systems, sub-systems, and components (e.g., centralized gas aftertreatment units 78 associated with centralized exhaust gas aftertreatment systems of the processing facility 42) that may operate independently or in combination to treat the gas flow (e.g., combination of natural gas and exhaust gas) received from the pipeline 40 to generate various outputs 102. As noted above, the pipeline 40 may receive both fuel gas (e.g., natural gas) that has been compressed by the compressor 14 and exhaust gas that has been compressed and prepared by the local exhaust gas compression pre-treatment systems of exhaust system 48. The centralized gas aftertreatment units 78 are configured to remove various undesirable substances (e.g., impurities, contaminants, and/or undesirable gases) in both the fuel gas (e.g., natural gas) and the exhaust gas of the combined gas flow. In certain embodiments, at least some or all of the centralized gas aftertreatment units 78 may be designed specifically to remove undesirable substances present in only the fuel gas, only the exhaust gas, or both the fuel gas and the exhaust gas. Thus, the centralized gas aftertreatment units 78 (e.g., common or shared units) designed to remove undesirable substances in both the fuel gas and the exhaust gas help to eliminate redundant systems, which may otherwise be present when processing the fuel gas and the exhaust gas flows separately. Depending on the particular content and type of fuel gas (e.g., natural gas) and the content of the exhaust gas, the centralized gas aftertreatment units 78 may include a plurality of parallel and/or series arrangements of centralized gas aftertreatment units 78. For the fuel gas portion of the gas flow, the centralized gas aftertreatment units 78 are configured to remove undesirable substances to prepare the fuel gas for downstream use by customers. For the exhaust gas portion of the gas flow, the centralized gas aftertreatment units 78 are configured to remove undesirable substances (e.g., undesirable exhaust gas emissions) in the exhaust gas. These undesirable substances may include, for example, carbon oxides ($CO_x$) such as carbon monoxide (CO) and carbon dioxide ($CO_2$), nitrogen oxides ($NO_x$) such as nitrogen monoxide (NO) and nitrogen dioxide ($NO_2$), sulfur oxides ($SO_x$) such as sulfur dioxide ($SO_2$), hydrocarbons (HC), and particulate matter such as soot.

In some embodiments, the processing facility 42 may include an acid gas removal (AGR) system 80, a dehydration system and/or water removal system 82, a mercury removal system 84, a nitrogen removal system 86, a helium removal system 88, a natural gas liquids (NGL) recovery system 90, and/or a heavy hydrocarbon removal system 92. The processing facility 42 may also include a blue hydrogen production system 94, a carbon capture system 96, and an ammonia production system 98. As illustrated, a gas flow (e.g., combination of natural gas and exhaust gas) may be received by the processing facility 42, and the gas flow may be directed through each of the systems 80-92 discussed above to generate commercial quality natural gas (CQNG). In turn, the CQNG may be delivered to customers for consumption. Further, as noted above, the gas flow directed towards the processing facility 42 may include various chemical compounds and/or substances, that when processed, generate various byproducts.

For example, the AGR system 80 is configured to remove acid gases, such as hydrogen sulfide ($H_2S$) and carbon dioxide ($CO_2$), from the gas flow using amine treatment, polymeric membranes, or a combination thereof, thereby enabling a first output of a treated gas and a second output of acid gases 100. The processing facility 42 may also include a sulfur removal unit (SRU) configured to convert the hydrogen sulfide in the acid gases from the AGR system 80 into either elemental sulfur or sulfuric acid using a Claus process. Additionally, the processing facility 42 may include a tail gas treatment unit (TGTU) configured to treat a tail gas from the sulfur removal unit and return any sulfur-containing compounds back to the sulfur removal unit. For example, the tail gas treatment unit may use a Shell Claus Offgas Treatment (SCOT) process and/or a Clauspol process. The AGR system 80, sulfur removal unit, and tail gas treatment unit are configured to handle the acid gases in the fuel gas and the exhaust gas in the combined gas flow from the pipeline.

Similarly, mercury 102, nitrogen 104, helium 106, natural gas liquid (NGL) 108, and heavy hydrocarbons 110 may be generated by the respective systems 84, 86, 88, 90, and 92 as byproducts. The water removal system 82 is configured to remove moisture from the treated gas output by the AGR system 80, for example, by using a glycol unit and/or a pressure swing adsorption (PSA) unit. The mercury removal system 84 may be configured to remove mercury 102 from the treated gas using adsorption systems, for example, with activated carbon or regenerable molecular sieves. The nitrogen removal system 86 may be included to remove nitrogen 104 from the treated gas, wherein the nitrogen removal system 86 may include a cryogenic nitrogen rejection system, an absorption system using a solvent as an absorbent, and/or an adsorption system using an adsorbent. The helium removal system 88 may include one or more fractional distillation units configured to remove helium 106. The NGL recovery system 90 may include one or more components to recover the natural gas liquids 108. The processing facility 42 may further include a NGL fractionation train having a plurality of distillation towers arranged in series, such as a demethanizer, a deethanizer, a depropanizer, a debutanizer, and/or a butane splitter. Additionally, the processing facility 42 may include sweeting units configured to sweeten the treated gas using one or more of a Merox process, a Sulfrex process, and/or molecular sieves. The foregoing systems 80-92 are intended to be non-limiting examples of systems that may enable treatment of the combined gas flow, including fuel gas and exhaust gas. Further, some of the byproducts generated may be used by additional systems employed by the processing facility 42.

For example, upon removing water 112, natural gas liquids 108, and heavy hydrocarbons 110 from the gas flow, the water 112, natural gas liquids 108, and heavy hydrocarbons 110 may be directed to the blue hydrogen production system 94 such that blue hydrogen 114 may be generated. For example, blue hydrogen production is the production of hydrogen using methane as the source of hydrogen with the carbon removed via the heavy hydrocarbon removal system 92 and/or the carbon capture system 96. Similarly, acid gases 100 and blue hydrogen 114 may be directed to the carbon capture system (CCS) 96 such that carbon oxides ($CO_x$) 116 such as carbon dioxide ($CO_2$) from the acid gases 100 output from the AGR system 80 are captured. The CCS 96 also may be part of a carbon capture and utilization (CCU) system configured to convert the captured $CO_x$ (e.g., $CO_2$) into various products, such as plastics, concrete, or synthetic carbon fuel(s). In some embodiments, the efficiency of the CCS 96 may be increased as the concentration of $CO_2$ in the combined gas flow increases. Accordingly, as noted above, in some embodiments, the gas compression system(s) 11 may operate using a sub-stoichiometric balance of intake air to fuel, thereby increasing the $CO_2$ concentration in the pipeline 40 and the efficiency of the CCS 96. Further still, the ammonia production system 98 may receive nitrogen 104 from the nitrogen removal system 86 and blue hydrogen 114 from the blue hydrogen production system 94, thereby enabling generation of ammonia 118. In some embodiments, by-products from the blue hydrogen production system 94 and/or the CCS 96 may be used to generate carbon fuels 120 (e.g., Fischer-Tropsch Liquids, synthetic methane, methanol, dimethyl ether, oxymethylene ethers). Each of the byproducts 100-120 may then be directed to other systems for future use. It should be noted that in some embodiments, the processing facility 42 may include multiple (e.g., two, three, four, or more) of the systems and/or sub-systems employed by the processing facility 42 for redundancy and/or greater throughput. For example, in the event that a first carbon capture system is inoperable, the processing facility may have other carbon capture systems that are capable of performing the actions of the first carbon capture system such that the processing facility 42 may remain operative.

Figure 5:
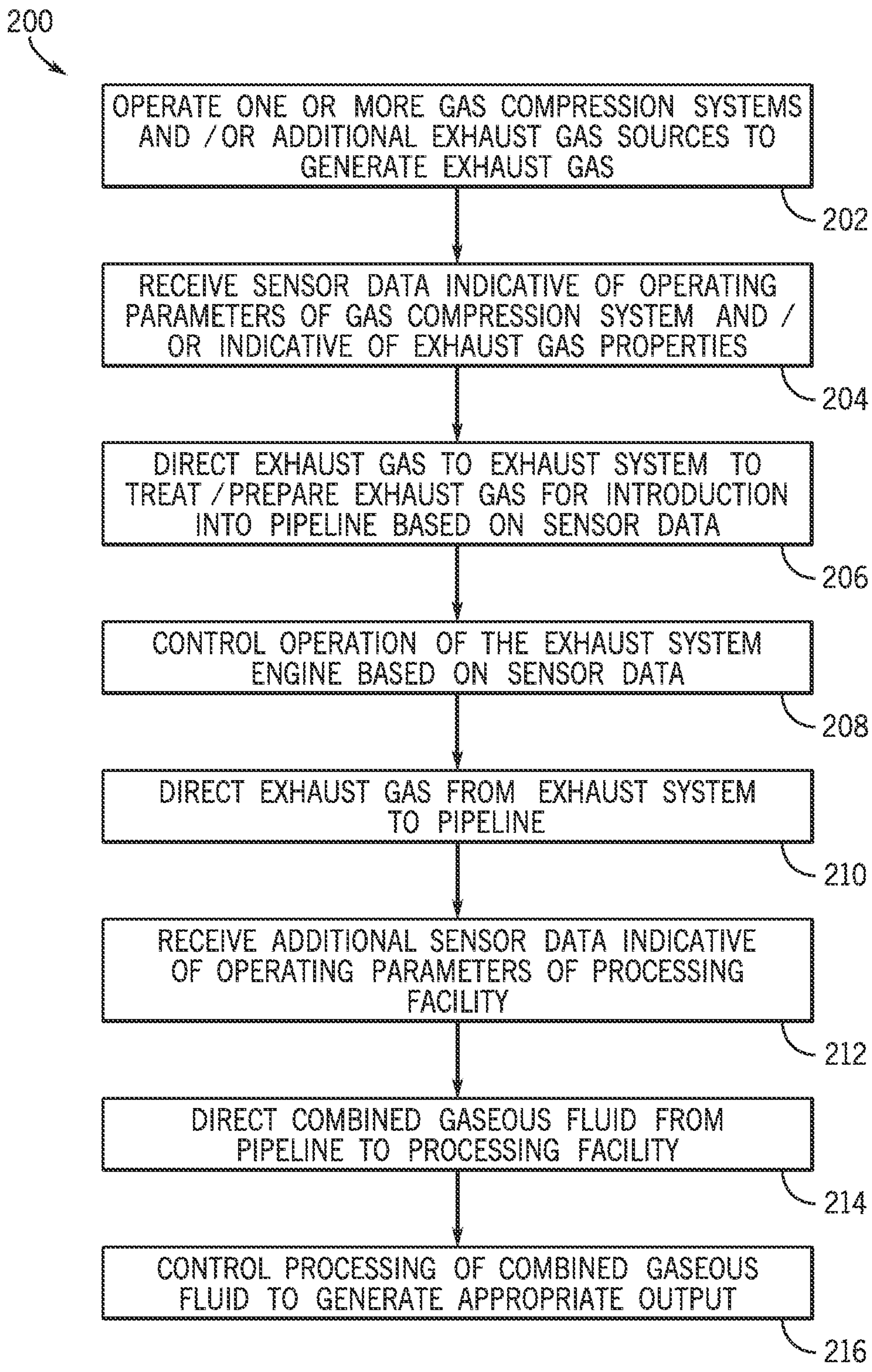
FIG. 5 is flow chart of an embodiment of a process for capturing exhaust gas released during operation of a natural gas processing site and delivering the exhaust gas to a natural gas pipeline for subsequent processing, in accordance with aspects of the present disclosure.

FIG. 5 is a flowchart of an example process 200 which may be employed by the controller 16 (or any other suitable computing device) to direct exhaust gas from various combustion systems (e.g., one or more engines of a gas compression system) to a processing facility for processing. Although the following description of the process 200 is described in a particular order, it should be noted that the process 200 is not limited to the depicted order; and instead, the process 200 may be performed in any suitable order. In addition, although the controller 16 is described as performing the process 200, it should be understood that one or more steps of the process 200 may be performed by any suitable computing device and the data may be communicated to the controller 16, thereby enabling performance of the steps described herein.

Referring now to FIG. 5, the controller 16, at block 202, may operate the engine 12 to drive the gas compressor 14 and/or may operate the additional engines 60 to drive the respective loads 62. In some embodiments, operating the engine 12 may include adjusting the fuel-to-air ratio, for example, for stoichiometric operation. The stoichiometric operation helps to reduce or substantially eliminate oxygen content and unburnt fuel in the exhaust gas.

At block 204, the controller 16 may receive sensor data from the one or more sensors 24 disposed throughout the gas processing site 10. As noted above, the sensor data may be indicative of one or more operating parameters of the gas compression system 11 (e.g., speed of engine 12, volume of fuel gas to be compressed by compressor 14, flow rate of fuel gas to be compressed by compressor 14, and the like). The sensor data may also be indicative of one or more properties of an exhaust gas produced by the engine 12, the engine 52, and/or the additional engines 60 and delivered to the exhaust system 48.

At block 206, the controller 16 may determine to direct the exhaust gas 46 to the exhaust system 48 based on the sensor data. For example, in response to determining that a sufficient amount of exhaust gas is available for compression via compressor 50, the controller 16 may send a signal to transition the valve 56 from a closed position towards an open position such that exhaust gas 46 may be directed to the exhaust system 48. Additionally, in some embodiments, the controller 16 may determine whether the exhaust system 48 is operative. For example, upon determining that the exhaust system 48 is not operative, the controller 16 may send a signal to transition the valve 56 towards a closed position, and transition the valve 57 towards an open position such that exhaust gas 46 may be directed to the vent 59. In some embodiments, the exhaust system 48 may include a backpressure sensor configured to monitor a backpressure of the exhaust system 48. For example, after directing a flow of exhaust gas 46 to the exhaust system 48, a backpressure sensor may provide an indication to the controller 16 that a threshold backpressure has been reached, which may be indicative of the exhaust system 48 being inoperative. Accordingly, the controller 16 may divert the exhaust gas 46 to the vent 59. Further, as noted above, in some embodiments, the exhaust system 48 may be configured to compress the exhaust gas and/or prepare the exhaust gas for introduction into the pipeline 40 (e.g., via local exhaust gas compression pre-treatment systems). For example, the exhaust system 48 may include various components (e.g., local exhaust gas compression pre-treatment systems, auxiliary treatments 64, multiple stages of compression, flame arrestors, coolers, liquids filters, particulate filters, air scavengers, dryers, and the like) which may serve to prepare the exhaust gas 46 for introduction into the pipeline 40. In certain embodiments, the exhaust system 48 may exclude any standard exhaust gas treatment systems (e.g., catalytic converters, mufflers, silencers, etc.) to remove undesirable emissions, such as one or more of carbon oxides ($CO_x$) such as carbon monoxide (CO) and carbon dioxide ($CO_2$), nitrogen oxides ($NO_x$) such as nitrogen monoxide (NO) and nitrogen dioxide ($NO_2$), sulfur oxides ($SO_x$) such as sulfur dioxide ($SO_2$), hydrocarbons (HC), and particulate matter such as soot. Thus, the exhaust system 48 may substantially reduce or eliminate equipment, costs, and space requirements associated with standard exhaust gas treatment systems at the exhaust system 48. However, the exhaust system 48 may still include local exhaust gas compression pre-treatment systems (e.g., water removal and/or particulate removal) to make the exhaust gas suitable for transport in the pipeline 40.

Upon directing exhaust gas 46 to the exhaust system 48, the controller 16 may, at block 208, control operation of the engine 52 based on the sensor data. For example, as noted above, the sensor data obtained by the one or more sensors 24 may be indicative of one or more properties (e.g., temperature, pressure, flow rate, volume) of the exhaust gas 46 directed to the exhaust system 48. Further, the controller 16 may include instructions to compress the exhaust gas 46 passing through the exhaust system 48 (e.g., compressed by compressor 50) to a desired pressure for introduction into the pipeline 40. Because the exhaust gas 46 directed to the exhaust system 48 may have varying pressures depending on the time of day and/or system from which the exhaust gas originated, the controller 16 may control a speed of the engine 52 and/or an amount of air 26 and fuel 30 delivered to the engine 52, thereby enabling the engine 52 to drive the compressor 50 to achieve a desired compression of the exhaust gas. For example, the controller 16 may include instructions to pressurize exhaust gas to 200 psi before delivering the exhaust gas to the pipeline 40. At a first time during the day, the exhaust system 48 may receive a first exhaust gas flow from engine 12 having a starting pressure of 30 psi, while at a second time during the day, the exhaust system 48 may receive a second exhaust gas flow from additional engines 60 having a starting pressure of 60 psi. Thus, the controller 16 may determine that 170 psi of additional compression is needed for the first exhaust gas flow and 140 psi of additional compression is needed for the second exhaust gas flow. Upon making these determinations, the controller 16 may operate the engine 52 at a specific speed and/or control an amount of air 26 and fuel 30 delivered to the engine 52 such that the engine 52 may drive the compressor 50 to achieve the desired additional compression of the exhaust gas flow directed through the exhaust system 48.

At block 210, after the exhaust gas has been compressed and prepared by the exhaust system 48 (e.g., via local exhaust gas compression pre-treatment systems), the controller 16 may direct the exhaust gas from the exhaust system 48 to the pipeline 40 to be mixed with fuel gas (e.g., natural gas) that has been compressed by the compressor 14. For example, as noted above, upon determining that the local exhaust gas compression pre-treatment systems of the exhaust system 48 have prepared and compressed the exhaust gas 46 to a desired pressure and/or removed a threshold amount of water, the controller 16 may transition the valve 51 towards an open position such that exhaust gas may be directed to the pipeline 40.

At block 212, the controller 16 may receive additional sensor data from one or more sensors 24 associated with the processing facility 42. For example, the one or more sensors 24 may capture data indicative of one or more components of the processing facility 42 being inoperable. Accordingly, the controller 16 may determine to transition the valve 41 towards a closed position such that exhaust gas is directed towards the vent 43 and away from the processing facility 42 when the processing facility 42 is inoperable. However, if the sensor data is indicative of the processing facility 42 being operational, the controller 16 may determine to transition the valve 41 towards an open position such that exhaust gas (and other fuel gas) within the gas pipeline 40 may be directed to the processing facility 42 for processing.

Upon determining that the processing facility 42 is operative, the controller 16 may, at block 214, direct the combined fuel gas (e.g., natural gas and exhaust gas) in the pipeline 40 to the processing facility 42 for processing. For example, as noted above, the controller 16 may send a signal to transition the valve 41 towards an open position such that fuel gas within the pipeline 40 may be directed to the processing facility 42.

At block 216, the controller 16 may control operation of the processing facility 42 to generate one or more products from the fuel gas. For example, as noted above, the processing facility 42 may include an acid gas removal system, a water removal system, a mercury removal system, a nitrogen removal system, a helium removal system, a natural gas liquids removal system, a heavy hydrocarbon removal system, a blue hydrogen production system, a carbon capture system, an ammonia production system, and/or other systems and processes. Each of the systems may be utilized to generate products and/or byproducts from the gas flow (e.g., combination of exhaust gas and fuel gas) directed to the processing facility 42. For example, each of the systems may act on the gas flow such that commercial grade natural gas is produced and undesirable gases are removed before any discharge of gases into the environment. Further, water removed from the gas flow may be combined with natural gas liquids and heavy hydrocarbons removed from the fuel gas in the blue hydrogen production system, thereby enabling production of blue hydrogen. In turn, the blue hydrogen may be directed to the carbon capture system along with acid gases removed from the gas flow to generate high pressure liquid $CO_2$. Further still, nitrogen removed from the gas flow may be combined with blue hydrogen produced by the blue hydrogen production system to generate ammonia as a byproduct. It should be noted that the examples above are not intended to be limiting and that the processing facility may include other systems and processes that enable generation of different byproducts.

Technical effects of the disclosed embodiments include systems and methods to capture an exhaust gas from one or more combustion systems (e.g., internal combustion engines driving compressors), and route the exhaust gas to a remote processing facility through a pipeline. In particular, the exhaust gas may be combined with one or more other gases, such as fuel gases (e.g., natural gas), in the pipeline for subsequent treatment by gas treatment systems in the processing facility. In certain embodiments, any number of combustion systems may direct exhaust gas into the pipeline at various locations, which may be miles apart from one another along the pipeline. The exhaust gas and fuel gas (e.g., a combined gas flow) is treated in the processing facility, thereby reducing or eliminating the need for local gas treatment systems at each of the locations having combustion systems. Furthermore, the processing facility may include certain gas treatment systems capable of improved reduction of exhaust emissions as compared with gas treatment systems typically used on site at combustion systems. For example, in certain embodiments, the gas treatment systems at the processing facility may reduce emissions of $CO_x$ such as CO and $CO_2$, $NO_x$ such as NO and $NO_2$, $SO_x$ such as $SO_2$, hydrocarbons, and/or particulate matter to lower concentration levels than typically achieved by gas treatment systems at combustion systems, such as internal combustion engines (e.g., reciprocating piston-cylinder engines).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas compression system, comprising:

a first compressor configured to compress a first gas for transport through a pipeline to a processing facility having one or more centralized gas aftertreatment systems; and a second compressor configured to compress a second gas for transport through the pipeline to the processing facility, wherein the first and second gases are different from one another, and the second gas comprises an exhaust gas from a combustion system.

2. The gas compression system of claim 1, wherein the combustion system comprises a first internal combustion engine coupled to the first compressor, a second internal combustion engine coupled to the second compressor, or a combination thereof.

3. The gas compression system of claim 2, comprising an exhaust gas recirculation (EGR) system configured to recirculate the exhaust gas into an intake of the first internal combustion engine.

4. The gas compression system of claim 2, wherein the combustion system is configured to operate using a stoichiometric air-to-fuel ratio or a sub-stoichiometric air-to-fuel ratio.

5. The gas compression system of claim 1, wherein the first gas comprises a fuel gas or a natural gas.

6. The gas compression system of claim 1, wherein the first gas comprises a non-natural gas carbon fuel.

7. The gas compression system of claim 1, wherein the one or more centralized gas aftertreatment systems comprise an acid gas removal (AGR) system, a dehydration system and/or water removal system, a mercury removal system, a nitrogen removal system, a helium removal system, a natural gas liquids (NGL) recovery system, a heavy hydrocarbon removal system, or a combination thereof.

8. The gas compression system of claim 7, wherein the one or more centralized gas aftertreatment systems comprise a blue hydrogen production system, a carbon capture system, an ammonia production system, a carbon fuel production system, or any combination thereof.

9. The gas compression system of claim 1, comprising one or more sensors configured to capture sensor data associated with the gas compression system, and a controller comprising a processor, a memory, and instructions stored on the memory and executable by the processor to control compression of the first and second gases for transport through the pipeline to the processing facility.

10. The gas compression system of claim 9, wherein the sensor data includes one or more properties of the first gas, one or more properties of the second gas, one or more operating conditions of the combustion system, one or more conditions of the processing facility, or any combination thereof.

11. The gas compression system of claim 10, wherein the one or more properties of the second gas comprise an oxygen concentration of the second gas, a relative stoichiometric balance of the second gas, or any combination thereof.

12. The gas compression system of claim 1, comprising an exhaust system configured to remove water, heat, particulates, oxygen, or any combination thereof from the second gas.

13. The gas compression system of claim 1, comprising the combustion system configured to generate the exhaust gas, wherein the combustion system excludes a standard gas treatment system configured to remove undesirable gases from the exhaust gas prior to transport through the pipeline to the processing facility, wherein the undesirable gases include at least one or more of carbon oxides ($CO_x$), nitrogen oxides ($NO_x$), and sulfur oxides ($SO_x$), and wherein the processing facility is located a threshold distance from the combustion system.

14. A method comprising:

compressing, via a first compressor of a gas compression system, a first gas for transport through a pipeline to a processing facility having one or more centralized gas aftertreatment systems; and compressing, via a second compressor of the gas compression system, a second gas for transport through the pipeline to the processing facility, wherein the first and second gases are different from one another, and the second gas comprises an exhaust gas from a combustion system.

15. The method of claim 14 comprising:

retrieving the first gas from a an unrefined source; and directing the first gas to the first compressor of the gas compression system.

16. The method of claim 14, wherein the first gas comprises a natural gas.

17. The method of claim 14, comprising transporting a combined gas flow including the first and second gases through the pipeline to the processing facility, and treating the combined gas flow with the one or more centralized gas aftertreatment systems in the processing facility.

18. The method of claim 17, wherein the one or more centralized gas aftertreatment systems comprise an acid gas removal (AGR) system, a carbon capture system, a dehydration system and/or water removal system, a mercury removal system, a nitrogen removal system, a helium removal system, a natural gas liquids (NGL) recovery system, a heavy hydrocarbon removal system, a blue hydrogen production system, an ammonia production system, a carbon fuel production system, or any combination thereof.

19. The method of claim 14, comprising driving the first compressor with a first internal combustion engine of the combustion system, driving the second compressor with a second internal combustion engine of the combustion system, and routing the exhaust gas from the first and second internal combustion engines to the second compressor.

20. An exhaust system comprising:

a first compressor configured to receive a first gas and compress the first gas to a first threshold pressure for transport through a pipeline to a processing facility;

an engine coupled to the first compressor and configured to drive the first compressor to compress the first gas;

a second compressor configured to receive a second gas and compress the second gas to a second threshold pressure for transport through the pipeline to the processing facility, wherein the first gas and the second gas are different from one another;

one or more sensors configured to capture sensor data indicative of one or more properties of the first gas; and a controller having a processor, a memory, and instructions stored on the memory and executable by the processor to control operation of the engine based on the sensor data.

* * * * *